United States Patent [19]

Lumbroso et al.

[11] Patent Number: 4,789,459

[45] Date of Patent: Dec. 6, 1988

[54] PROCESS FOR RECOVERING POWER FROM A FLUID CATALYTIC CRACKING UNIT USED PARTICULARLY FOR THE TREATMENT OF HEAVY CHARGES

[75] Inventors: Daniel Lumbroso, Rueil-Malmaison; Jean-Paul LePage, Le Vesinet, both of France

[73] Assignee: Institut Francais du Petrole, Rueil-Malmaison, France

[21] Appl. No.: 920,342

[22] Filed: Oct. 17, 1986

[30] Foreign Application Priority Data

Oct. 17, 1985 [FR] France .................................. 85 15551
Feb. 7, 1986 [FR] France .................................. 86 01807

[51] Int. Cl.$^4$ ............................................. B01D 47/00
[52] U.S. Cl. ..................................... 208/155; 208/113; 208/164; 502/43; 60/39.04
[58] Field of Search ............... 208/162, 164, 113, 155, 208/151; 502/43, 41; 60/39.02, 39.03, 39.04; 422/144

[56] References Cited

U.S. PATENT DOCUMENTS

| | | | |
|---|---|---|---|
| 3,532,620 | 10/1970 | Asmus et al. ....................... | 208/113 |
| 3,702,308 | 11/1972 | Baver et al. ...................... | 208/113 X |
| 4,081,508 | 3/1978 | Luckenback ....................... | 502/39 X |
| 4,176,084 | 11/1979 | Luckenback ....................... | 208/164 |
| 4,371,453 | 2/1983 | Vickers .................................. | 502/41 |
| 4,419,221 | 12/1983 | Castagnos, Jr. et al. ....... | 208/104 X |
| 4,430,201 | 2/1984 | Castagnos, Jr. et al. .......... | 208/164 |
| 4,539,303 | 9/1985 | MacLean et al. ................ | 208/113 X |

Primary Examiner—Glenn Caldarola
Attorney, Agent, or Firm—Millen & White

[57] ABSTRACT

The invention concerns a process for recovering power in a fluid catalytic cracking unit used particularly for the treatment of heavy charges, wherein at least a portion of the power available in the gas flows withdrawn from two catalyst regenerators (4) and (21) of a fluid bed catalytic cracking unit are recovered.

According to the invention the fumes from regenerator (4) are fed to one of the stages of a turbine (35), the pressure in this stage being lower than the pressure of the fumes from regenerator (4) and the fumes from regenerator (21) (whose pressure is lower than that prevailing in the first regenerator (4)) are fed to another stage of the same turbine (35) whose pressure is lower than that of the stage to which the fumes of regenerator (4) are supplied.

7 Claims, 3 Drawing Sheets

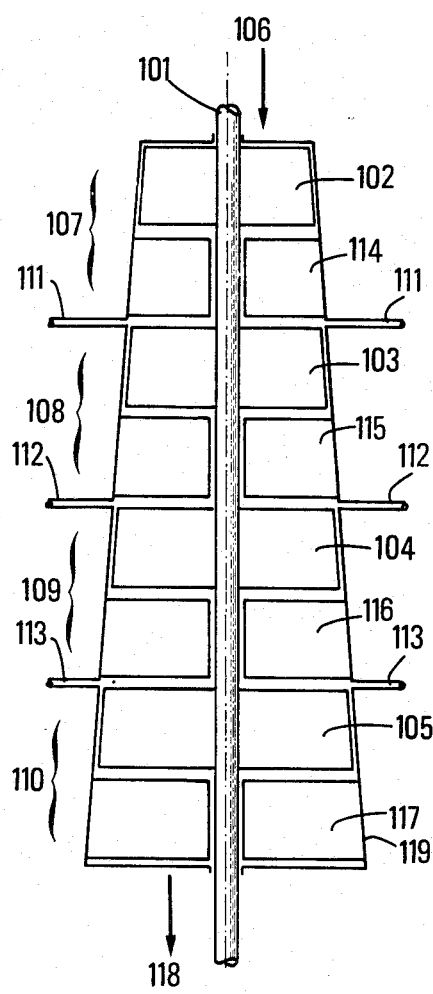

PROCESS FOR RECOVERING POWER FROM A FLUID CATALYTIC CRACKING UNIT USED PARTICULARLY FOR THE TREATMENT OF HEAVY CHARGES

The present invention pertains to the field of fluid catalytic cracking of hydrocarbon charges.

BACKGROUND OF THE INVENTION

It is known as usual, in the oil industry, to use cracking processes wherein the hydrocarbon molecules of high molecular weight and high boiling point are split into smaller molecules whose boiling point may be in lower temperature ranges, adapted to the desired use.

Presently, the most usual process for this purpose is the so-called fluid catalytic cracking or FCC process. In this type of process, the hydrocarbon charge is vaporized and contacted at high temperature with a cracking catalyst which is maintained suspended in the charge vapors. When the desired molecular weight has been reached by cracking, with a corresponding decrease of the boiling points, the catalyst is separated from the obtained products, stripped, regenerated by combustion of the formed coke and then again contacted with the charge to be cracked.

In a new FCC process, called R2R, two regeneration zones are used wherethrough circulates the used catalyst.

The charges to be cracked are usually injected in the reaction zone at a temperature generally ranging from 80° to 400° C., under a relative pressure of 0.7 to 3.5 bars, the temperature of the regenerated catalyst reaching said zone being of about 600° to 950° C.

For sake of clarity, FIGS. 1 and 2 show the known usual structure of a reactor of tubular type with double regeneration; however, according to the present invention, any convenient reactor, conventional and not necessarily of the "riser" type (tube with ascending flow of the charge and of the catalyst) can be used. Other existing reactors are shaped as tubes with downward flow of the fluids from a line not shown. The catalyst is introduced at the bottom of the charge elevator 1 of the riser type through a line 2, in an amount determined by the opening or the closure of a valve 3. The catalyst particles are then ejected towards the top of the riser by injecting at the bottom of the latter a gaseous fluid supplied from a line not shown; this injection is performed through a fluid distributor. The charge to be cracked is introduced at an upper level through a line, not shown, and vaporized through a suitable device within the dense flow of the catalyst particles.

The top of column or riser 52 opens into an enclosure 1 which, for example, is concentric thereto and wherein are performed, on the one hand, the separation of the cracked charge and, on the other hand the stripping of the used catalyst. The treated charge is separated in a cyclonic system which is housed in enclosure 1, at the top of which is provided a discharge line 50 for the cracked charged, whereas the used catalyst particles are reintroduced at the bottom of enclosure 1, by means of any suitable device such for example as the T-member 51.

The so-stripped particles of used catalyst are discharged from the bottom of enclosure 1 towards a first regenerator 4 through a line 3 provided with a regulating valve. In regenerator 4, the coke deposited on the catalyst particles is burnt with air injected from the bottom of the regenerator through a line 39, via regularly spaced injectors 55. The particles of the treated catalyst and the combustion gas are separated in cyclones 56, wherefrom the combustion gas is discharged through line 5.

The catalyst particles having undergone a first partial regeneration treatment are then transferred to a second stage 21 of the regenerator through the central duct 58.

The bottom part of stage 21 is also fed with air through a line 20 and injectors 54. The particles of regenerated catalyst are laterally discharged towards a buffer enclosure 59 and are recycled through line 2 to the riser feeding system. The combustion gases discharged from the upper part of stage 21 are treated in an external cyclonic system 60 which accordingly is adapted to perfectly withstand the high temperatures resulting from a complete combustion of coke and at the bottom of which the catalyst particles are fed back, through line 61, to stage 4, whereas the combustion gases are discharged through line 22.

This assembly of catalytic cracking unit, equiped with a two-stage regenerator with upward flow, has the following advantages:
  double regeneration of the catalyst, whereby a complete combustion of coke is achieved without alteration of the catalytic properties,
  no temperature limitation in the second regenerator, whereby the catalyst can reach the temperature required for vaporizing the charge, mainly when the latter is a heavy charge,
  improvement of the thermal stability and of the catalyst resistance to metals.

The hydrocarbons charges convenient as feed for units of the type shown may contain hydrocarbons having boiling ranges from 200° to 550° C. or more and a density from 10° to 35° API, but they may also consist of heavy charges containing hydrocarbons whose boiling point may be as high as 750° C. and more and whose density may be from 10° to 35° API.

The catalysts adapted for use in the above-described devices comprise the cracking catalysts of the crystalline alumino-silicate type, certain types of silica-alumina, of silica-magnesia, of silica-zirconium, all having relatively high cracking activities.

Crystalline alumino-silicates may be natural or prepared by synthesis according to techniques well-known in the art. They may be selected from synthetic zeolites or clays such as faujasite, certain mordenites, montmorillonite, bridged clays, alumino-phosphates or similar substances.

In certain FCC units, a recovery turbine is used in the fumes circuit. But it must be known that the use of these different techniques, which show the interest of recovering power still available at the regenerator output, is accompanied with many difficulties associated with the insertion of the recovery turbine in the unit. FIG. 1 illustrates the use of a turbine in a unit of FCC process of R2R type. In this unit, the fumes issued from the first regenerator wherethrough passes the catalyst is supplied to a turbine.

SUMMARY OF THE INVENTION

Now, in spite of the difficulties which might be encountered for building a unit according to FIG. 1, wherein a turbine is fed with the only fumes from one regenerator, this type of flow-sheet has been improved according to FIG. 2 wherein the power recovery is increased to a substantial extent by feeding the turbine also with the fumes from the second regenerator wherethrough passes the catalyst, the invention being further characterized in that the fumes from said second regenerator are fed to the turbine at a level different from that to which are supplied the fumes from the first regenerator. The power saving resulting from this new invention is sufficient to justify this modification.

BRIEF DESCRIPTION OF THE DRAWINGS

FIG. 3 discloses a turbine comprising an apparatus formed of an enclosure generally of frustro-conical shape.

The apparatus comprises four chambers located about a revolving shaft which is the axis of a rotor 101, designed to recover power by driving external machines.

DETAILED DESCRIPTION OF THE DRAWINGS

Figure 1:
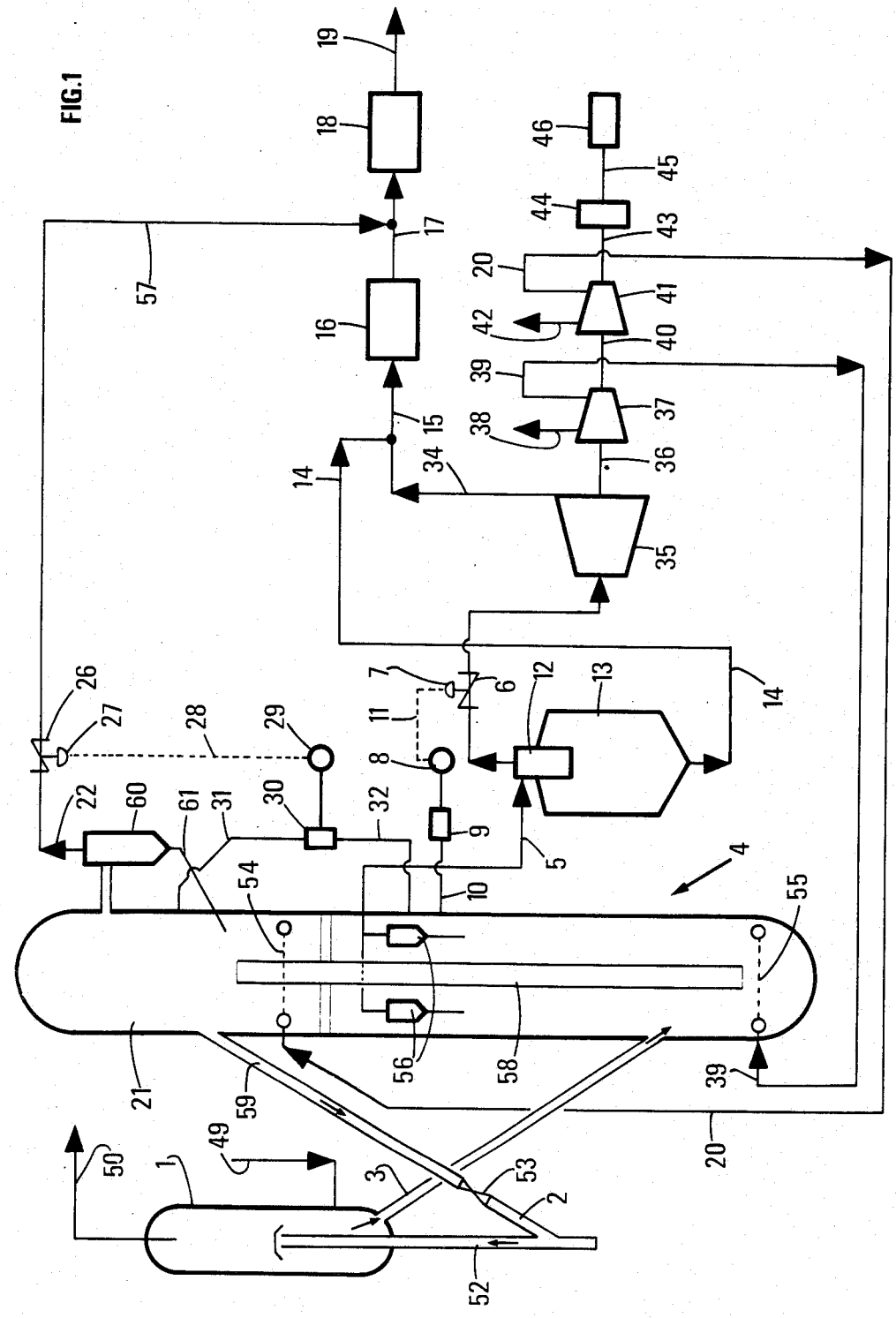
FIG. 1 discloses a turbine fed with fumes from a regenerator 4. These fumes are conveyed towards a turbine 35, and fumes from a regenerator 21 are not conveyed towards the turbine but are directly fed with the effluent of a coboiler 16.

FIG. 1 shows the pressure sensors 30, 29, 28, 27 in the two regenerators 21 and 4 through lines 31 to 32, as well as the pressure sensors 10, 9, 8, 7 for the pressure of regenerator 4. The fumes withdrawn from regenerator 4 are conveyed through line 5 to a catalyst separation zone 13 for retaining the catalyst driven along with the fumes from the regenerator and thus protecting the turbine 35 from a quick wear. From zone 13 are recovered at the top (at 12) the major part of the fumes and at the tail, through line 14, fine catalyst particles which generally are continuously discharged through the leak line 14 and conveyed through line 15 to a CO boiler 16.

The gas effluent withdrawn at 12 passes through the regulation and security valve 6 towards turbine 35 which here, by way of example, consists of a one-stage turbine mounted on axis 36, 40, 43. From the turbine output, at the opposite of the fumes input in the turbine, the fumes are conveyed through line 34 and then through line 15 containing fine catalyst particles whose conveyance was achieved by carefully avoiding their passage through the turbine. The fumes are fed to the CO boiler 16, then through line 17 (with the fumes originating from the second regenerator through line 22, valve 26 and line 57) towards the output and chimney 19 and 18.

On the figure, two blowers or air compressors 37 and 41 are shown. Air inputs are not shown. A portion of the air from blower 37 through line 39 flows, for example, at least partly, into regenerator 4; a portion of the air from blower 41 through line 20 flows, for example, at least partly, into regenerator 21. Lines 38 and 42 are optional leak lines for an eventual air excess. Device 44 represents the alternator or reducer-multiplier. Device 46 is the electric motor or generator.

Figure 2:
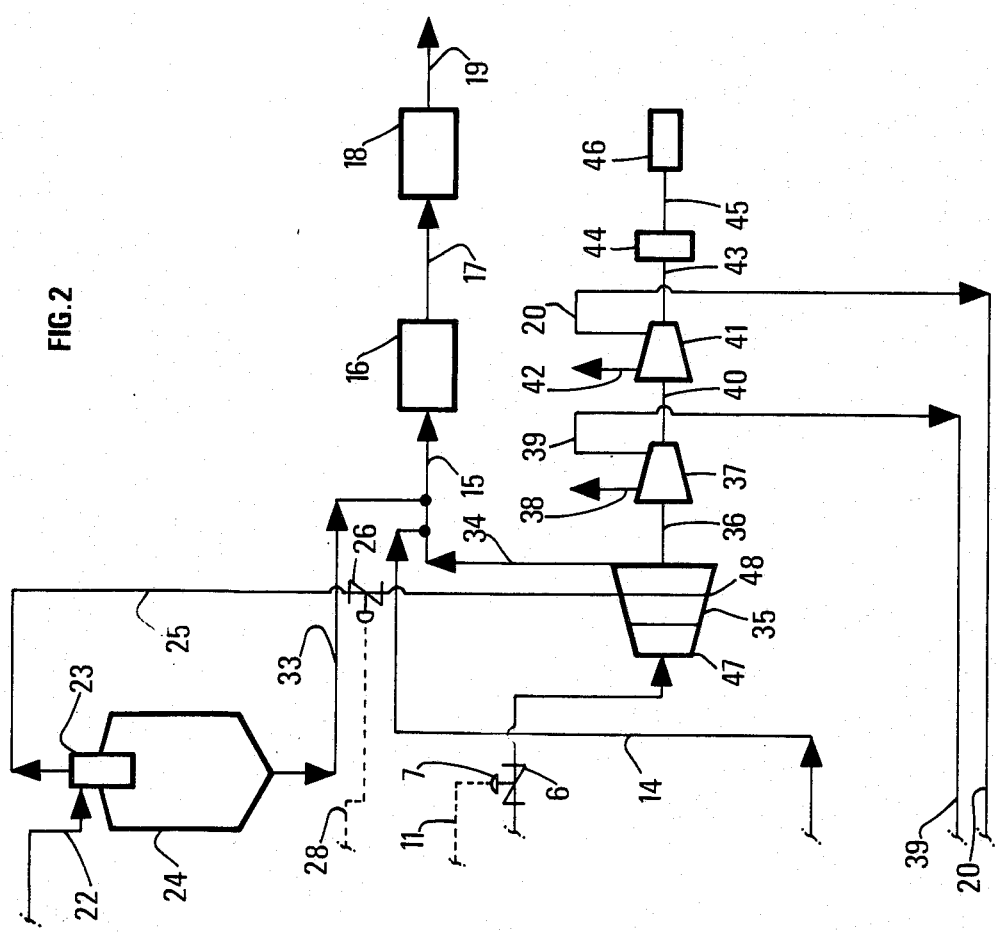
In FIG. 2, according to the invention, fumes of regenerator 4 are sent into one stage of turbine 35, with fumes originating from the regenerator also being conveyed to turbine 35 at stage 48.

The invention is illustrated in FIG. 2 showing a preferred non-limitative embodiment of the invention. On this FIG. 2 the parts already described in relation with FIG. 1 have the same reference numbers. The main difference with respect to FIG. 1 results from the use of a multistage turbine (for example with 4 stages) and from the omission of line 57 of FIG. 1: the fumes from regenerator 21 are not directly fed with the effluent of the CO boiler 16 but are fed through line 22 to a separation zone 24 similar to separation zone 13. The major part of the gas effluent (line 25) is separated therein from the fine catalyst particles (line 33). The fine catalyst particles from line 33 are admixed with those from line 14 and treated together in the CO boiler with the gas effluent from turbine 15.

The gas effluent withdrawn from the upper part 23 of zone 24 is introduced, in conformity with the invention, after passage through the regulation and security valve 26, into turbine 35 but at another stage (stage 48) than that (47) of introduction of the fumes originating from regenerator 4. The fumes from both regenerators 4 and 21 are withdrawn together from turbine 35 through line 34 and fed to the CO boiler 16. The basic rule for the selection of the stages of the multistage turbine is explained hereinafter.

In conformity with the invention, the regeneration operating principle in R2R process is based on the circulation of the catalyst from regenerator 4 to regenerator 21. This circulation results from a pressure in regenerator 4 necessarily higher than that in regenerator 21 (for example respectively 2.0 bar and 1.2 bar). The absolute pressure in regenerator 21 is generally 70–80% of that prevailing in regenerator 4. In the present condition, the power recovery is obtained from fumes at high pressure originating from regenerator 4. As a counterpart, this recovery makes it possible to compress the air used in said regenerator for combustion. However the power available in the fumes of regenerator 21 is not recovered and is completely wasted through the control valve (point 28 of FIG. 1). Thus the invention also concerns the recovery of all or a part of the power available in the fumes from regenerator 21 in association with that from regenerator 4.

The recovery turbine is generally formed of several stages (for example 3 to 5). The fumes from regenerator 4 are fed to a high pressure stage, at an intake pressure of about 1.7 bar, for example. The expanded gases are ejected at a counterpressure of about 0.1 bar, for example. As a rule, the fumes from regenerator 21 are fed to a stage of the turbine where the pressure is lower than or equal to that of the fumes. By way of illustrative example, with a 4-stage turbine and with the above-indicated intake and exhaust pressures, the pressure distribution is of the following type:

$P_1$ = 1.70 bar (intake at the first stage of the turbine of the fumes from regenerator 4)

$P_2$ = 1.16 bar (at the second stage of the turbine)

$P_3$ = 0.73 bar (intake at the third stage of the fumes of regenerator 21)

$P_4$ = 0.38 (intake at the fourth stage)

$P_{output}$ = 0.10 bar

Thus, according to the present invention, and still by way of example, the fumes from regenerator 21 (see FIG. 2) may be fed to the intake of the third stage in spite of a pressure drop of about 0.3 bar through the lines, the separator 24 and the control valve. As a matter of fact, the respective pressure values are:

Pressure in regenerator 21 = 1.2 bar

Output pressure from regenerator 21 through line 22 (after primary separation of fines = 1.03 bar)

Intake pressure of the third stage = 0.73 bar.

The resultant increase of power available on the shaft may be used for example for compressing the combustion air destined to regenerator 21 (duct 20).

The use of the gas expanding device 35 for recovering power makes thus possible to introduce several gas flows at different pressure and temperature levels. It results that it is then possible to recover on the same turbine the power from different gas flows by taking advantage of the different stages of a multi-stage turbine. By the use of a multi-stage turbine it is hence possible to introduce another flow (the flow of fumes from the second regenerator) in addition to that originating from the preceding stage (flow of fumes from the first regenerator).

The only required condition is that the pressure level of the intake gas be at least equal, or preferably at least slightly higher, than that of the turbine stage to which is supplied the considered flow. The elements of the turbine are of course of a size adapted to receive the two gas flows.

EXAMPLE

The following example is given to illustrate the invention but must not be considered as limiting in any way the scope thereof.

This example concerns the treatment of the fumes from regenerators of a FCC unit operating according to FIGS. 1 and 2, i.e. according to the so-called "R2R" system, with ascending tubular reactor and catalyst regeneration in two reaction zones. It is performed either by expanding the fumes withdrawn from regenerators through a single turbine as in operation A below or, as in operation B, through a 4-stage turbine operating at the following pressures, in decreasing order:

1st stage input: $P_1 = 1.90$ bar
2nd stage input: $P_2 = 1.42$ bar
3rd stage input: $P_3 = 0.96$ bar
4th stage input: $P_4 = 0.50$ bar
4th stage input: $P_5 = 0.06$ bar The cracking unit operates at a rate of 40000 barrels per day of charge, in gasoline run (about 6400 $m^3$/day).

Operation A (not conforming with the invention)

A first operation in conducted in accordance with FIG. 1, i.e. the fumes from the second regenerator 21 are not conveyed to the turbine.

The fumes withdrawn from regenerator 4, through line 5 are at a pressure of 1.96 bar and at a temperature of 692° C. Their flow rate is 164,600 kg/h. They contain 510 mg/$Nm^3$ of catalyst particles and have the following molar composition in percent:

| | |
|---|---|
| $N_2$: | 70.85 |
| CO: | 4.50 |
| $CO_2$: | 11.55 |
| $H_2O$: | 13.10 |
| | 100.00 |

These gases are fed to a turbine whose number of stages is unimportant since only the fumes from the first regenerator enter said turbine. The power recovered by the expansion of said gases corresponds to a recovered power of 11586 HP (8527 KWatts).

Operation B

This operation is similar to operation A with the 4-stage turbine, but with a flow originating from the second regenerator at a pressure of 1.02 bar and a temperature of 767° C., at a rate of 80,200 kg/h and whose molar composition in percent is:

| | |
|---|---|
| $N_2$: | 75.60 |
| CO: | 0.05 |
| $CO_2$: | 15.85 |
| $O_2$: | 1.95 |
| $H_2O$: | 6.55 |
| | 100.00 |

(catalyst particles content: 450 mg/$Nm^3$)

This flow, in said operation B, is introduced at a stage of the turbine and more precisely at that stage of the turbine where the pressure is at a level just lower than the pressure of the flow of fumes from the second regenerator. The pressure of the fumes from the second regenerator being here 1.02 bar, it is hence convenient to feed them to the third stage of the turbine whose pressure $P_3$ is 0.96 bar. These gases, supplied at the above-defined levels, will develop an additional measured power of 4430 HP (3260 kWatts). The use of this additional flow in the turbine provides for an increase of the power recovery of $4430/11586 \times 100 =$ about 38%.

There is thus recovered, on the turbine shaft, a total power of 15900 HP (11702 kWatts). This increase of recovered power is substantial. In particular, as emphasized at the beginning of the present disclosure, the equipment with a turbine of such a FCC unit gave rise precedingly to operating difficulties which induce to discard the use of a turbine. Here, on the contrary, the power saving is sufficiently high to justify the continuous use of a turbine in the system, in spite of these difficulties.

A new type of turbine, particularly adapted to the device for carrying out the process, is described below.

The device consists of an apparatus for producing power from a gas at high pressure, higher than atmospheric pressure and (or) at high temperature.

These gases are successively expanded through expanding chambers provided with rotors having suitable blades. The apparatus comprises successive chambers with blades of increasing diameter supported on the same axis.

This device is modified in order to receive additional gas flows in each chamber, these gas flows being at a different pressure, lower than that of the gas fed to the first chamber This gas is then supplied to the chamber where prevails a pressure just below that of this additional gas flow.

The device may be applied to several gas flows of different pressures and at pressure levels compatible with those of the different chambers of the expansion system driving the blades in rotation.

The apparatus described by way of example is formed of an enclosure, generally of frusto-conical shape comprising a succession of at least 2 chambers substantially of frusto-conical shape (4 chambers in FIG. 3) located about a revolving shaft which is the axis of a rotor (101), destined to recover the power by driving external machines (for example generators and/or blowers).

This apparatus, as examplified in FIG. 3 by way of example, comprises 4 expansion chambers of reference numbers 107, 108, 109 and 110. FIG 3 shows a turbine placed vertically, but the turbine might be placed horizontally or in any other position.

The turbine comprises, in the inner part of the chambers, 4 series of blades 102, 103, 104 and 105 (at least one blade per stage) whose diameter preferably increases in the direction of the gas advance (or of the pressure drop). These blades are formed of paddles; for sake of clarity only one paddle per stage is shown on the figure but it must be understood that the paddles of each stage are radially extending over the whole section of the turbine, i.e. over 360° about the axis of rotor 101. The gas which is at the high pressure is supplied through the opening of the first chamber 107 and is ejected on the paddles of blade 102 in the first expansion chamber 107.

The gas is at a pressure P1 at the inlet of chamber 107 and at a pressure P at the outlet of the 4th chamber 110.

An additional gas whose pressure P'1 is higher than P and lower than P1 is then admitted, through at least one orifice 111, with the gas originating from chamber 107, into chamber 108 and strikes the paddles of blade 103.

The same is true for the successive gas flows: pressure P'1 in line 111 feeding chamber 108, P'2 in line 112 feeding chamber 109, P'3 in line 113 feeding chamber 110, will respectively range between pressures P1 and P2 (P2: pressure at the output of chamber 109), pressures P2 and P3 (P3: pressure at the output of chamber 110) and pressures P3 and P.

Thus the power developed by all these gas flows at different pressures will be recovered on the main shaft 101 for producing power or driving other machines, as above-explained by way of example.

At the level of each stage, the pulsed gases drive in rotation a series of blades with paddles on which said gas strikes. The paddles are radially extending from the axis of the rotor and hence substantially perpendicular by to said axis. Then the gases ejected from the paddles flow through a series of deflector assemblies 114, 115, 116 and 117. For sake of clarity the figure shows only one deflector per stage, but it must be understood that the deflectors at each stage extend over 360° about the axis of rotor 101, i.e. extend radially over the whole section of the turbine; here the deflectors are thus also radially extending from the rotor axis, substantially vertically to said axis. But they are fixed to the inner fixed wall (stator) 119 of the turbine enclosure; each deflector assembly, as well as each blade assembly extends over the whole section of the considered stage.

The paddles of the blade (or blades) of a given stage are alternately staggered with the deflectors of each deflector assembly; the deflectors at each stage are substantially of the same size as the paddles of the blades of the considered stage; the paddles of each blade assembly are fixed on the axis of rotor 101, are movable about said axis, whereas, on the contrary, the deflectors are stationary and fixed onto the inner wall of the cone frustum substantially formed by the turbine enclosure (stator). The gas motion at the output of the deflectors is so calculated that the gas flows perpendicularly to the walls of the paddles of the next series encountered by the gas flow, and so on through a new train of deflectors and a new train of blades. Whereas the diameter of the paddles, radially extending about the axis, increases in the direction input (106)-output (118) of the gases of the turbine, similarly, the diameter of each train of deflectors radially extending about the same rotor axis also increases in the same direction input (106)-output (118).

What is claimed as the invention is:

1. A process for fluid catalytic cracking of a hydrocarbon charge in a reaction zone, whereafter the catalyst is withdrawn from the reaction zone and then partially regenerated in a first regeneration zone, withdrawn from said first regeneration zone and fed to a second regeneration zone whose pressure is lower than the pressure prevailing in said first regeneration zone, said process being characterized in that the fumes withdrawn from the first regeneration zone, after removal therefrom of the catalyst fine particles eventually contained therein, are supplied to a turbine comprising several stages, the pressures in each stage decreasing in the direction of flow of the fumes passing therethrough, said fumes being thus introduced in the stage of higher pressure of the turbine, said process being also characterized in that the fumes withdrawn from the second regeneration zone, after removal therefrom of the fine catalyst particles eventually contained therein, are conveyed to said turbine in a stage thereof other than that to which are supplied the fumes withdrawn from the first regeneration zone, the stage at which are supplied the fumes from the second regeneration zone being at a pressure lower than or equal to the pressure of said fumes in the second regeneration zone.

2. A process according to claim 1 wherein the turbine comprises four stages.

3. A process according to claim 1 wherein the fumes from the first regeneration zone are introduced into the first stage of the turbine and the fumes from the second regeneration zone are introduced into the third stage of the turbine.

4. A process according to claim 1 wherein the fumes from the second regeneration zone are introduced into the turbine at a lower pressure than the fumes introduced into the turbine from the first regeneration zone.

5. A process according to claim 1 further comprising combining the fumes from the two regeneration zones after said fumes have expanded through said turbine and joining resultant fumes with said fine catalyst particles previously removed from said fumes prior to being introduced into said turbine.

6. A process according to claim 1 wherein said two stages of said turbine have a common axis with at least two blowers for air-containing gas, and utilizing the turbine energy obtained from said first and second regeneration gases to blow said air-containing gas into the two regeneration zones.

7. A process according to claim 1, said fumes being recovered together, then joined with any fine catalyst particles from which they were separated before admission into the turbine and then fed to a CO boiler, wherein at least a portion of air-containing gas from two blowers having the same axis as the turbine at least partly feed two regeneration zones in order to effect therein the combustion of the used catalyst.

* * * * *